(12) United States Patent
Plummer

(10) Patent No.: US 7,258,137 B2
(45) Date of Patent: Aug. 21, 2007

(54) SYSTEM, METHOD, AND APPARATUS FOR DUAL GAS DELIVERY THROUGH A HIGH TEMPERATURE ARTIFACT WITHOUT UNDESIRABLE GAS MIXING

(75) Inventor: Ronald E. Plummer, Decatur, TX (US)

(73) Assignee: Poco Graphite, Inc., Decatur, TX (US)

(*) Notice: Subject to any disclaimer, the term of this patent is extended or adjusted under 35 U.S.C. 154(b) by 301 days.

(21) Appl. No.: 11/005,994

(22) Filed: Dec. 7, 2004

(65) Prior Publication Data

US 2005/0133104 A1 Jun. 23, 2005

Related U.S. Application Data

(60) Provisional application No. 60/528,278, filed on Dec. 9, 2003.

(51) Int. Cl.
*F02G 1/00* (2006.01)
(52) U.S. Cl. ............... 137/599.03; 137/896; 366/336; 366/340
(58) Field of Classification Search ........... 137/599.03, 137/896, 897, 898; 366/336, 340
See application file for complete search history.

(56) References Cited

U.S. PATENT DOCUMENTS

| | | | |
|---|---|---|---|
| 2,815,532 A | 12/1957 | Braunlich | |
| 2,823,075 A | 2/1958 | Shirley et al. | |
| 3,064,680 A * | 11/1962 | Winslow, Jr. | 366/340 |
| 3,232,590 A * | 2/1966 | Eckert | 366/336 |
| 3,936,382 A | 2/1976 | White | |
| 4,752,452 A | 6/1988 | Harbolt et al. | |
| 4,793,247 A | 12/1988 | Verweij | |
| 5,037,619 A | 8/1991 | Alary et al. | |
| 5,463,967 A | 11/1995 | Gielow et al. | |
| 5,881,756 A | 3/1999 | Abbasi et al. | |
| 6,132,079 A | 10/2000 | King | |
| 6,210,268 B1 | 4/2001 | Fleissner | |
| 6,241,601 B1 | 6/2001 | Han et al. | |
| 6,547,433 B2 | 4/2003 | Yazici et al. | |

FOREIGN PATENT DOCUMENTS

GB 911 421 A 11/1962

* cited by examiner

Primary Examiner—Stephen M. Hepperle
(74) Attorney, Agent, or Firm—Bracewell & Giuliani LLP

(57) ABSTRACT

A system conveys two gases separately until controlled delivery and gas mixing are desired. The device maintains separation between the two gases with sealed, high temperature materials, and a geometry that contains gas flow channels that do not allow gas mixing. The present design provides a seal at the interfaces between components. An outer ring and an inner spool are assembled together to form a single component that accommodates the input of two, initially separate gases, and then contains and conveys the two gases separately to an exit surface where outlet holes allow the two gases to mix and react in a controlled manner upon exiting the component. The inlet holes for both gases are located on one side of the spool. The exit holes are formed in a centralized, alternating, completely interspersed array or grid-like pattern on the opposite surface of the spool.

27 Claims, 5 Drawing Sheets

SYSTEM, METHOD, AND APPARATUS FOR DUAL GAS DELIVERY THROUGH A HIGH TEMPERATURE ARTIFACT WITHOUT UNDESIRABLE GAS MIXING

The present patent application claims the benefit of U.S. Provisional Patent Application No. 60/528,278, filed on Dec. 9, 2003, and is incorporated herein by reference.

BACKGROUND OF THE INVENTION

1. Technical Field

The present invention relates in general to the controlled mixing of gases and, in particular, to an improved system, method, and apparatus for controlling the delivery of two gases through a high temperature artifact without undesirable mixing of the gases during transmission through the artifact.

2. Description of the Related Art

In some industrial applications, two gases must be mixed and reacted in a controlled atmosphere at very high temperatures. However, maintaining separation between the two gases with components fabricated from non-reactive materials is a significant obstacle for at least two reasons. First, high temperature materials (such as graphite) are often porous and require a seal or coating to form a gas barrier. This is a material surface type seal, or material seal. Secondly, manufacturing and assembling high temperature artifacts into a geometry that contains gas flow channels that do not allow gas mixing has not been accomplished previously. One of the greatest difficulties is sealing at the interfaces between components (e.g., a component-to-component seal). In prior art designs, the separate gases were channeled past both material seal areas and component interface seal areas. Sealing technology for either type of these areas is significant, and sealing both types of areas together has eluded both design and manufacturing technology to date.

For example, U.S. Pat. No. 6,132,079, to King, discloses a multi-path mixing apparatus for mixing water and an herbicide at low temperature. However, that patent utilizes many separate components that form a multitude of interfaces and seals that inevitable permit some level of mixing. Similarly, U.S. Pat. No. 2,815,532, to Braunlich, discloses a spinneret mixing element analogous interfaces and seals in the working zone. These devices simply cannot form high temperature seals for highly reactive gases. When gas flow is used for chemical reaction to facilitate a process (e.g., semiconductor processing; especially etching), the difficulty often becomes that of handling and conveying the reactive chemical gases to the process area. Additionally, the reaction itself requires high temperature materials such as carbon, glass, or ceramics to convey the gases and not react or interfere with the process. Thus, an improved solution for controlling the delivery of two gases through a high temperature artifact without undesirable mixing of the gases during transmission through the artifact would be desirable.

SUMMARY OF THE INVENTION

One embodiment of a system, method, and apparatus for conveying two gases separately from each other to control delivery and gas mixing is disclosed. This design and manufacturing approach utilizes high temperature materials as components, such as graphite or silicon carbide (SiC). The present invention provides a producible manufacturing approach to meet functional requirements that overcome prior art engineering, design, and manufacturing issues relating to keeping two gases separate prior to mixing. By manufacturing flow channels for both gases into one component, the ring and spool design of the present invention minimizes the risk and difficulty of combining two seal technologies.

In one embodiment of the present invention, a two-piece design comprising an outer ring and an inner spool is provided. The two pieces assemble together (e.g., with threads, etc.) to form a single, dual gas showerhead component that accommodates the input of two, initially separate gases, and then contains and conveys the two gases separately to an exit surface where outlet holes allow the two gases to mix and react in a controlled manner upon exiting the component. The inlet holes for both gases are located on one side of the spool. The inlet holes for the first gas are small and located in a center grid array on the spool, and the inlet holes for the second gas are larger and located at a perimeter of the spool in a circular array. The exit holes are formed in a centralized, alternating, completely interspersed array or grid-like pattern on the opposite surface of the spool.

The spool has the appearance of two plates that are separated by a large number of integrally formed, spaced-apart columns. The second gas flows around the perimeter and through oval slots in the circumference of the spool between the plates before exiting the lower surface of the spool. The second gas is separated from the first gas by a material seal (e.g., coating) without the presence of a mechanical seal. The first gas flows through holes in the columns, which the second gas flows in channels and troughs between the columns. Thus, the first gas flows directly through spool from top to bottom, whereas the second gas flows and fills from the perimeter of the spool and through the columns before exiting the bottom of the spool. The circumference of the spool must be left open for access during manufacturing. The ring engages the spool to seal its open circumference (and interior) and prevent the escape of the second gas from the spool. Only the second gas contacts both the spool and the ring. The seal between the spool and the ring is mechanical, and any leaks therethrough does not cause mixing with the first gas.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
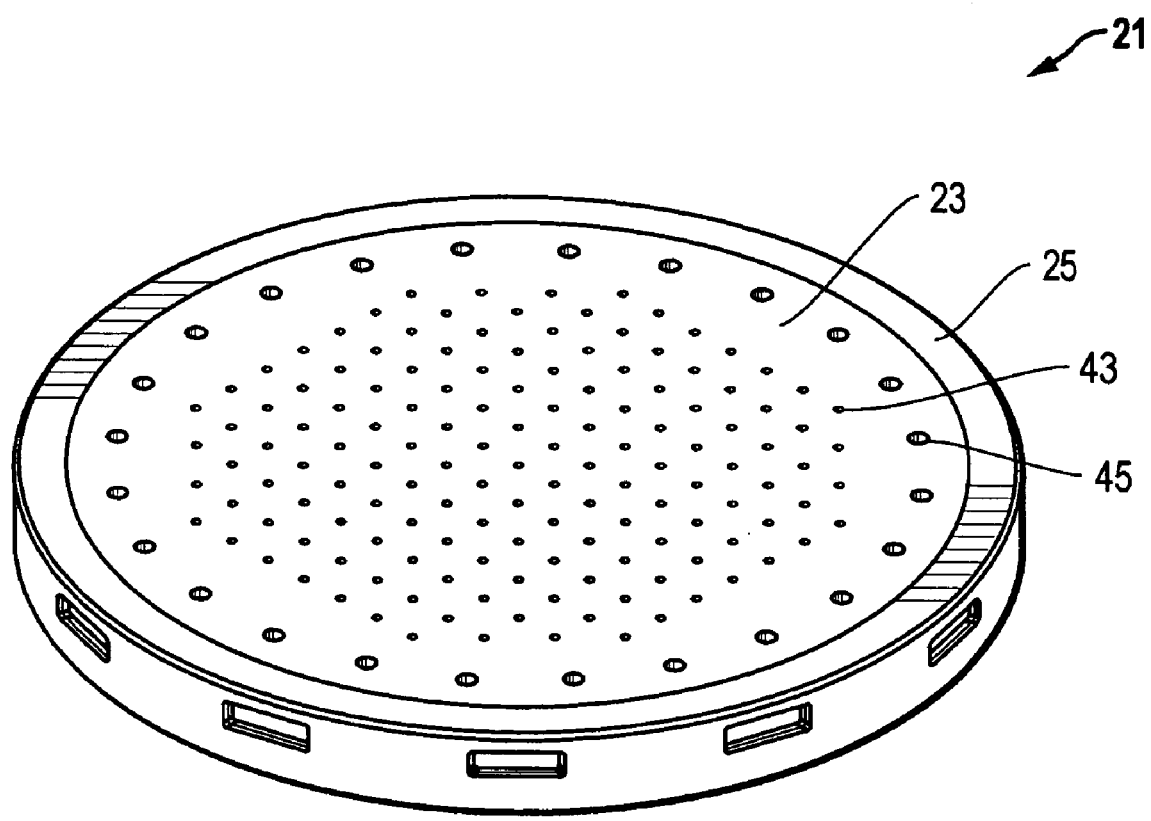
FIG. 1 is an upper isometric view of one embodiment of an apparatus constructed in accordance with the present invention.
Figure 2:
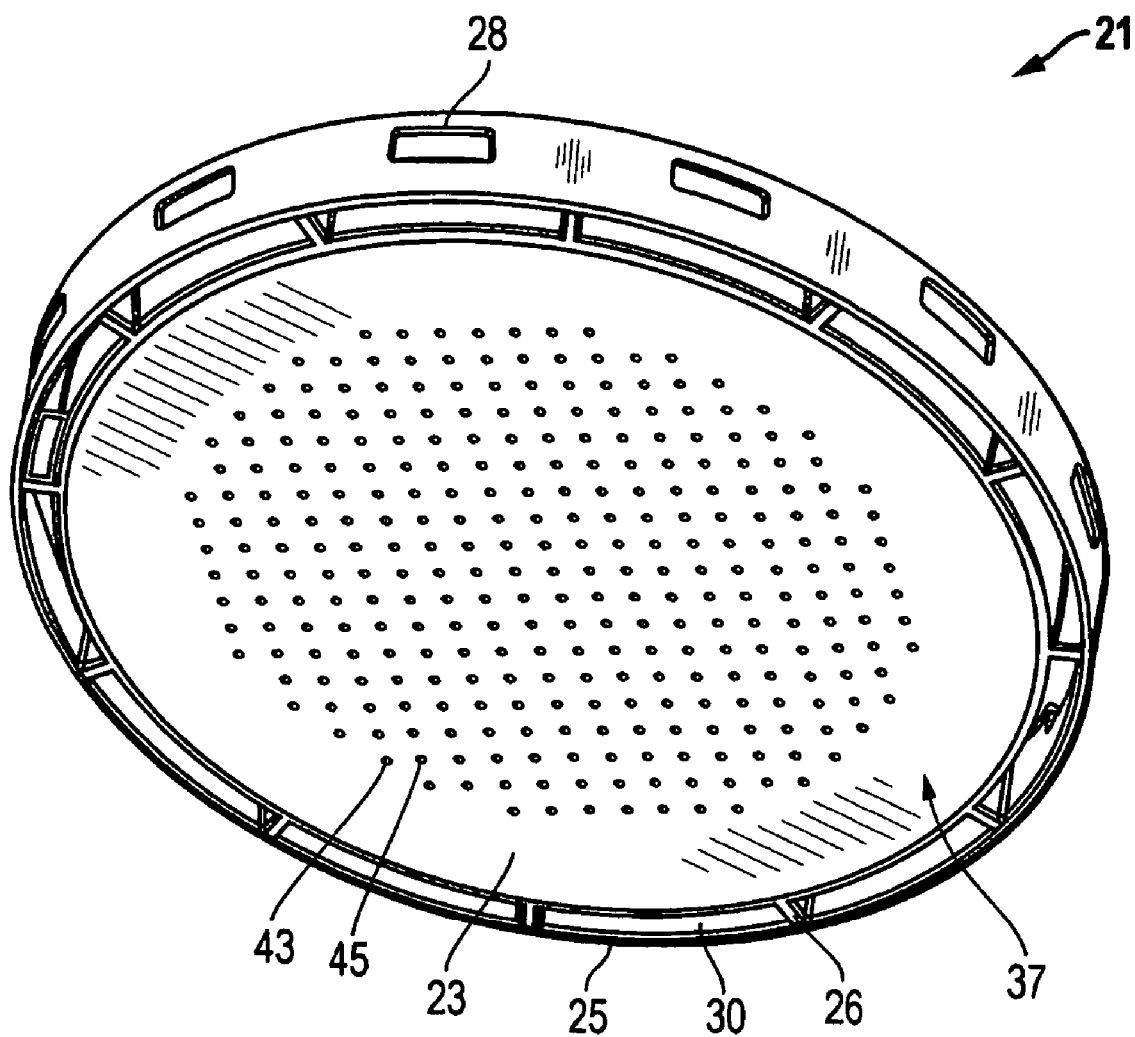
FIG. 2 is a lower isometric view of the apparatus of FIG. 1.
Figure 3:
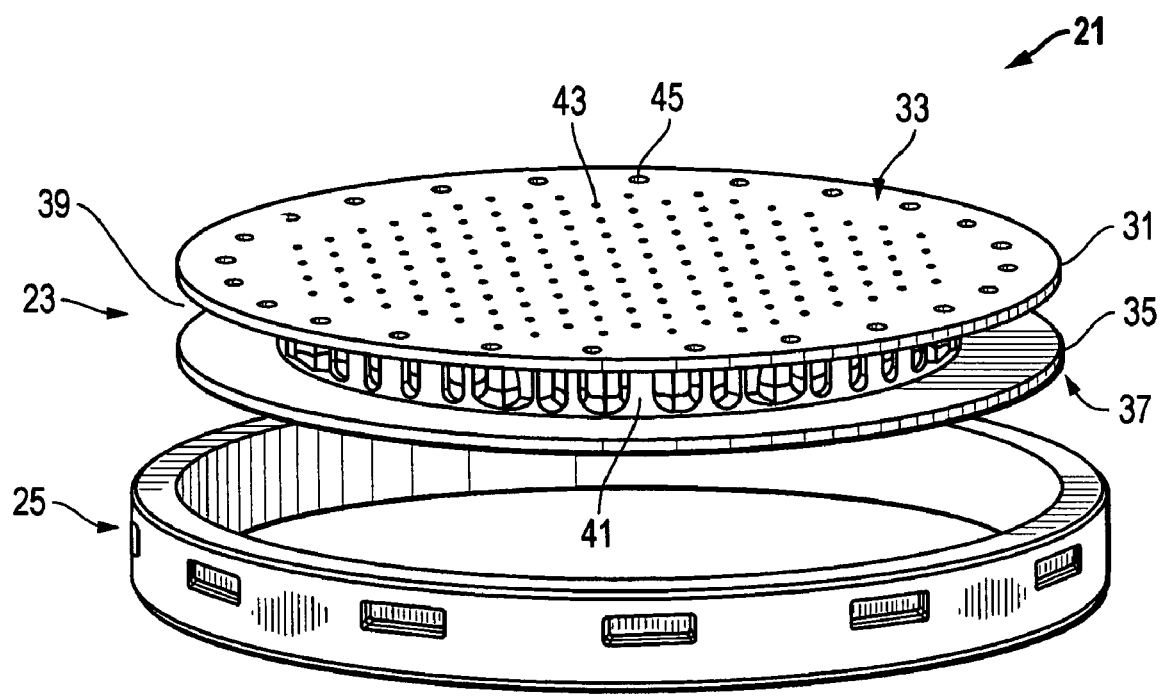
FIG. 3 is an exploded, upper isometric view of a ring and spool of the apparatus of FIG. 1.
Figure 4:
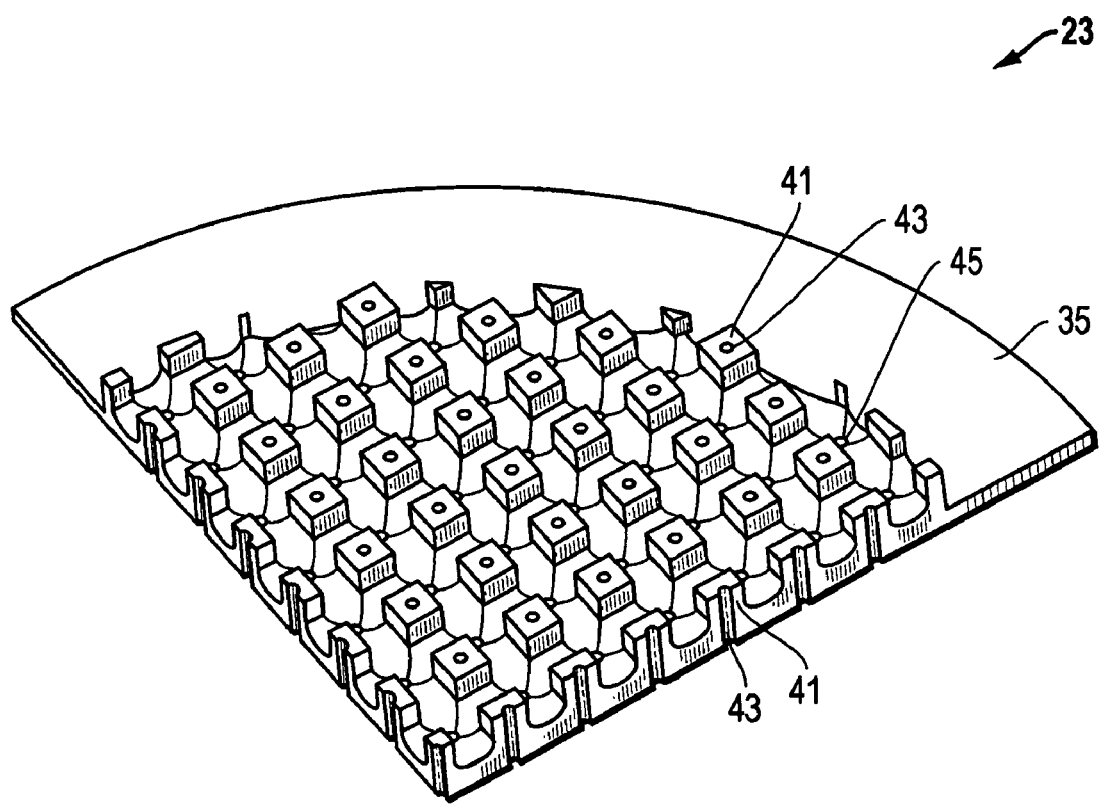
FIG. 4 is an upper, sectional, quarter-portion, isometric view of the spool of FIG. 3.
Figure 5:
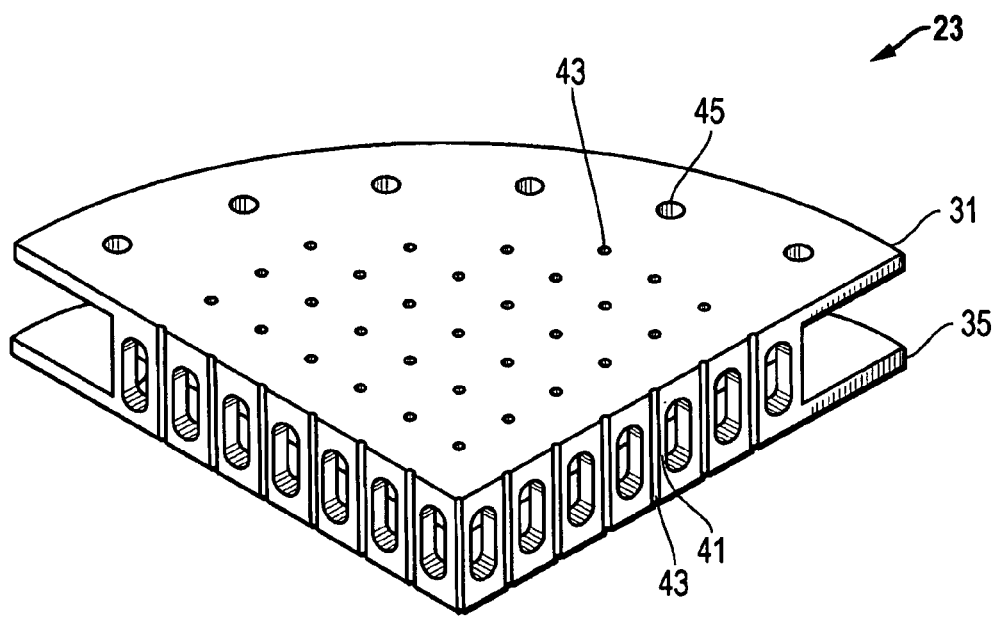
FIG. 5 is a full upper, quarter-sectional, isometric view of the spool of FIG. 3.
Figure 6:
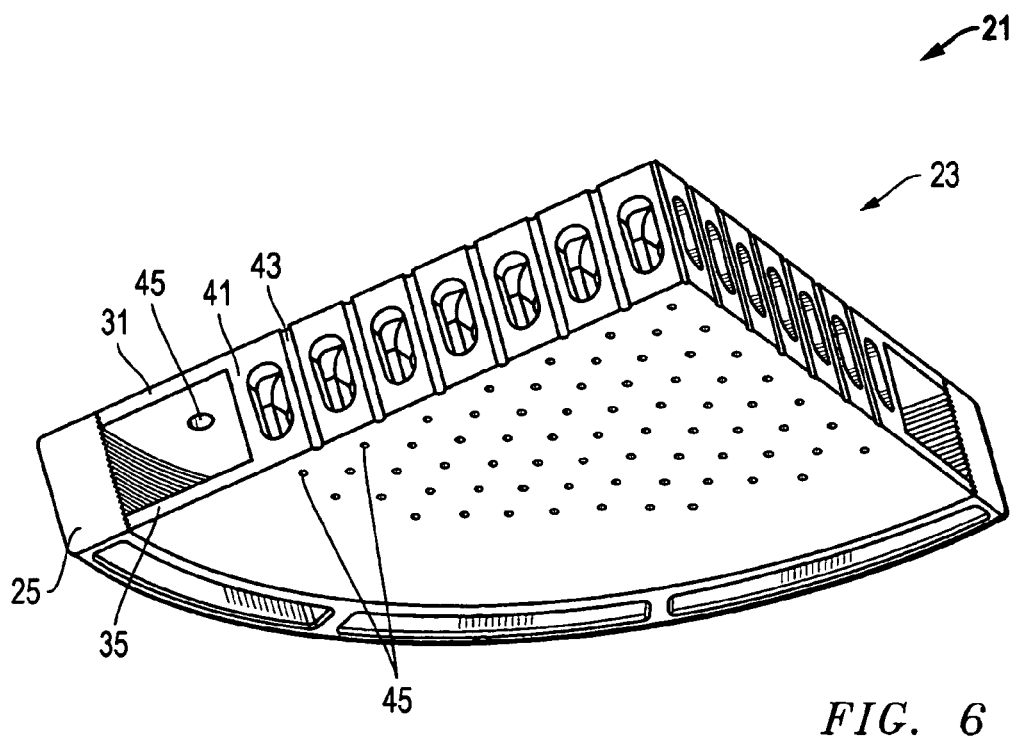
FIG. 6 is a full lower, quarter-sectional, isometric view of the assembled ring and spool comprising the apparatus of FIG. 1.

Referring to FIGS. 1-6, one embodiment of an apparatus, system, and method of separately conveying two gases through an apparatus or artifact 21 without mixing the gases as they are transmitted through the artifact is disclosed. The artifact 21 comprises two components 23, 25 that are preferably each machined separately or independently from a solid block of material to form two, completely integral structures. The first component 23 is a cylindrical spool having an inlet plate 31 (FIG. 3) with an inlet surface 33 and an outlet plate 35 with an outlet surface 37. The inlet and outlet plates 31, 35 are spaced apart from each other to define an interior having a perimeter 39 that is at least partially exposed to an exterior of the first component 23.

The first component 23 also has a plurality of integral posts or columns 41 extending between the inlet and outlet plates 31, 35 that are accessible from the perimeter for machining or fabrication purposes. In the embodiment shown, the rectangular columns are spaced radially inward from the perimeter 39. The columns 41 in the interior of the first component 23 define a plurality of slots, cavities, channels, and troughs for a set of passages 45, as will be described below.

A first set of passages 43 (e.g., gas flow passages) is formed in each of the plates 31, 35 and extends contiguously through at least some (and, in one embodiment, all) of the columns 41 between the inlet and outlet surfaces 33, 37. The first set of passages 43 are provided for conveying a first gas. In one embodiment, the first set of passages 43 comprises straight axial apertures that are parallel to each other. A second set of passages 45 is formed in each of the plates 31, 35 and extends contiguously around at least some of the columns 41 in the interior in a labyrinthine manner between the inlet and outlet surfaces 33, 37. The second set of passages 45 are provided for conveying a second gas and are completely, fluidically isolated from the first set of passages 43. In one embodiment, the inlet and outlet plates 31, 35 are parallel to each other, and the first and second set of passages 43, 45 are coplanar at both the inlet and outlet surfaces 33, 37.

At the inlet surface 33, the second set of passages 45 are formed in a circle adjacent the perimeter 39 and circumscribe the first set of passages 43 which are formed in a central, grid-like array. Also at the inlet surface 33, the second set of passages 45 are larger and size and fewer in number than the first set of passages 43. At the outlet surface 37, the first and second set of passages 43, 45 are completely interspersed in a centralized, alternating, grid-like array as shown. Also at the outlet surface 37, the first and second set of passages 43, 45 are approximately equal in size and number.

The second component 25 is a cylindrical ring that secures to the first component 23 to seal the interior of the first component 23 and capture the second set of passages 45 to form the single component or artifact 21. In the embodiment shown, the ring 25 has a plurality of chambers separated by spokes 26 with outer ports 28 and edge ports 30.

When assembled, the artifact 21 receives two, initially separate gases, and conveys the two gases separately from the inlet surface 33 to the outlet surface 37, such that the two gases mix and react in a controlled manner upon exiting at the outlet surface 37. In the embodiment shown, the first component 23 is an inner spool, the second component 25 is an outer ring, the perimeter 39 of the inner spool 23 completely exposes the interior of the inner spool 23 around a circumference thereof, and the outer ring 25 threadingly seals (FIG. 6) to the perimeter 39 of the inner spool 23 to form the single component 21.

The first and second set of passages 43, 45 are separated by a material seal coating without the presence of a mechanical seal. The ring 25 engages the spool 23 to seal its open circumference 39 (and interior) and prevent the escape of the second gas from the spool 23. Only the second gas contacts both the spool 23 and the ring 25. The seal between the spool 23 and the ring 25 is mechanical, and any leaks of the second gas therethrough do not cause mixing with the first gas.

In operation, the artifact 21 comprises a single assembly having two sets 43, 45 of inlets and outlets for separate dispersion of two gases so that they react as soon as they are mixed. The artifact 21 may be formed from a number of materials, but is particularly well suited for high temperature applications (such as semiconductor applications having very hot and very reactive environments) requiring silicon (Si), silicon carbide (SiC), quartz, aluminum, graphite, and steel for working materials. In one embodiment, the present invention is formed from pyrolytic graphite-coated graphite. Ideally, the two components 23, 25 of the present invention (i.e., the ring and the spool) are each machined from a solid slab of graphite or SiC.

For example, the components 23, 25 of the present invention may be fabricated with pyrolytically-coated graphite via the following steps: (1) graphite machining of dual gas flow paths in multiple components that are assembled after fabrication; graphite assembly is a fabrication step that provides the unique fabrication option of producing complex geometry, especially geometry with internal features and enclosures that are not possible by many other manufacturing means; (2) purity provides advantages in many applications; (3) pyrolytic coating provides a seal at the surfaces of the porous graphite components; in essence, the machined graphite becomes a core or substrate and the pyrolytic carbon layer becomes the functional interface with the gas flow in the application; and (4) assembly is a fabrication step that completes the physical shape of the two gas flow paths necessary for function.

In one alternate embodiment, the present invention is fabricated from SiC by the same first step described above, and then (2) conversion to porous SiC to provide a unique and economical method of fabricating a near net shaped component; this involves a chemical vapor conversion (CVC) of carbon supplied by the machined and/or assembled graphite into SiC by introducing Si during the process; (3) SiC assembly is a fabrication option; (4) SiC grinding (secondary machining) is a fabrication step providing high precision features that cannot be achieved in the CVC process; SiC machining is applied when near net shape accuracy is insufficient; (5) SiC coating is a fabrication step that applies a non-porous layer of SiC onto the porous SiC produced in (2) above; chemical vapor deposition (CVD) deposits the layer of SiC; the difference or benefit is a function of whether the application requires a porous material or a non-porous material; and (6) SiC enhancement processes are applied to enhance the porous SiC from Step (2); the enhanced processes involve filling the pores of the porous SiC with Si or SiC.

The present invention has several advantages, including the ability to reduce the gas-to-gas seal to that of only a material-type seal. This is accomplished by manufacturing separate flow channels for both gases into one component (e.g., the spool). This design reduces the component-to-component seal area to only one gas. The present invention further provides for a manufacturing approach to independently fabricate and seal the material (e.g., graphite) porosity of each component of the design.

While the invention has been shown or described in only some of its forms, it should be apparent to those skilled in the art that it is not so limited, but is susceptible to various changes without departing from the scope of the invention.

What is claimed is:

1. An apparatus for separately conveying two gases through a single artifact, comprising:
    a first component having an inlet plate with an inlet surface and an outlet plate with an outlet surface, the inlet and outlet plates being spaced apart from each other to define an interior having a perimeter that is at least partially exposed to an exterior of the first component, and the first component also having a plurality of integral columns extending between the inlet and outlet plates that are accessible from the perimeter;
    a first set of passages formed in each of the plates and extending contiguously through at least some of the columns between the inlet and outlet surfaces for conveying a first gas;
    a second set of passages formed in each of the plates and extending contiguously around at least some of the columns in the interior between the inlet and outlet surfaces, and the second set of passages being completely fluidically isolated from the first set of passages for conveying a second gas, such that the first and second set of passages are separated by a material seal coating without the presence of a mechanical seal;
    a second component secured to the first component to seal the interior of the first component and capture the second set of passages to form a single component that receives two, initially separate gases, and conveys the two gases separately from the inlet surface to the outlet surface, such that the two gases mix and react in a controlled manner upon exiting at the outlet surface; and
    both the first and second components are formed from a high temperature material selected from the group consisting of graphite, SiC, and pyrolytic graphite-coated graphite.

2. An apparatus as defined by claim 1, wherein the inlet and outlet plates are parallel to each other, the first and second set of passages are coplanar at both the inlet and outlet surfaces, and the first set of passages comprises straight axial apertures that are parallel to each other.

3. An apparatus as defined by claim 1, wherein the first component is an inner spool, the second component is an outer ring, the inner spool and the outer ring are both cylindrical, the perimeter of the inner spool completely exposes the interior of the inner spool around a circumference thereof, and the outer ring threadingly seals to the perimeter of the inner spool to form the single component.

4. An apparatus as defined by claim 1, wherein, at the inlet surface, the second set of passages are formed in a circle adjacent the perimeter and circumscribe the first set of passages which are formed in a central, grid-like array, and, at the outlet surface, the first and second set of passages are completely interspersed in a centralized, alternating, grid-like array.

5. An apparatus as defined by claim 1, wherein, at the inlet surface, the second set of passages are larger in size and fewer in number than the first set of passages, and, at the outlet surface, the first and second set of passages are approximately equal in size and number.

6. An apparatus as defined by claim 1, wherein the columns in the interior of the first component define a plurality of slots, cavities, channels, and troughs in the second set of passages.

7. An apparatus for separately conveying two gases through a single artifact, comprising:
    a first component having an inlet plate with an inlet surface and an outlet plate with an outlet surface, the inlet and outlet plates being spaced apart from each other to define an interior having a perimeter that is at least partially exposed to an exterior of the first component, and the first component also having a plurality of integral columns extending between the inlet and outlet plates that are accessible from the perimeter;
    a first set of passages formed in each of the plates and extending contiguously through at least some of the columns between the inlet and outlet surfaces for conveying a first gas; a second set of passages formed in each of the plates and extending contiguously around at least some of the columns in the interior between the inlet and outlet surfaces, and the second set of passages being completely fluidically isolated from the first set of passages for conveying a second gas;
    a second component secured to the first component to seal the interior of the first component and capture the second set of passages to form a single component that receives two, initially separate gases, and conveys the two gases separately from the inlet surface to the outlet surface, such that the two gases mix and react in a controlled manner upon exiting at the outlet surface; and wherein
    both the first and second components are formed from a high temperature material selected from the group consisting of graphite, SiC, and pyrolytic graphite-coated graphite.

8. An apparatus as defined by claim 7, wherein the first set of passages comprises straight axial apertures that are parallel to each other.

9. An apparatus as defined by claim 7, wherein the inlet and outlet plates are parallel to each other, and the first and second set of passages are coplanar at both the inlet and outlet surfaces.

10. An apparatus as defined by claim 7, wherein the first component is an inner spool, the second component is an outer ring, the inner spool and the outer ring are both cylindrical, the perimeter of the inner spool completely exposes the interior of the inner spool around a circumference thereof, and the outer ring threadingly seals to the perimeter of the inner spool to form the single component.

11. An apparatus as defined by claim 7, wherein, at the inlet surface, the second set of passages are formed in a circle adjacent the perimeter and circumscribe the first set of passages which are formed in a central, grid-like array, and, at the outlet surface, the first and second set of passages are completely interspersed in a centralized, alternating, grid-like array.

12. An apparatus as defined by claim 7, wherein, at the inlet surface, the second set of passages are larger in size and fewer in number than the first set of passages, and, at the outlet surface, the first and second set of passages are approximately equal in size and number.

13. An apparatus as defined by claim 7, wherein the columns in the interior of the first component define a plurality of slots, cavities, channels, and troughs in the second set of passages.

14. An apparatus as defined by claim 7, wherein the first and second set of passages are separated by a material seal coating without the presence of a mechanical seal.

15. An apparatus for separately conveying two gases through a single artifact, comprising:
   a first component having an inlet plate with an inlet surface and an outlet plate with an outlet surface, the inlet and outlet plates being spaced apart from each other to define an interior having a perimeter that is at least partially exposed to an exterior of the first component, and the first component also having a plurality of integral columns extending between the inlet and outlet plates that are accessible from the perimeter;
   a first set of passages formed in each of the plates and extending contiguously through at least some of the columns between the inlet and outlet surfaces for conveying a first gas;
   a second set of passages formed in each of the plates and extending contiguously around at least some of the columns in the interior between the inlet and outlet surfaces, and the second set of passages being completely fluidically isolated from the first set of passages for conveying a second gas;
   a second component secured to the first component to seal the interior of the first component and capture the second set of passages to form a single component that receives two, initially separate gases, and conveys the two gases separately from the inlet surface to the outlet surface, such that the two gases mix and react in a controlled manner upon exiting at the outlet surface; and wherein
   the first component is an inner spool, the second component is an outer ring, the inner spool and the outer ring are both cylindrical, the perimeter of the inner spool completely exposes the interior of the inner spool around a circumference thereof, and the outer ring threadingly seals to the perimeter of the inner spool to form the single component.

16. An apparatus as defined by claim 15, wherein the first set of passages comprises straight axial apertures that are parallel to each other.

17. An apparatus as defined by claim 15, wherein the inlet and outlet plates are parallel to each other, and the first and second set of passages are coplanar at both the inlet and outlet surfaces.

18. An apparatus as defined by claim 15, wherein, at the inlet surface, the second set of passages are formed in a circle adjacent the perimeter and circumscribe the first set of passages which are formed in a central, grid-like array, and, at the outlet surface, the first and second set of passages are completely interspersed in a centralized, alternating, grid-like array.

19. An apparatus as defined by claim 15, wherein, at the inlet surface, the second set of passages are larger in size and fewer in number than the first set of passages, and, at the outlet surface, the first and second set of passages are approximately equal in size and number.

20. An apparatus as defined by claim 15, wherein the columns in the interior of the first component define a plurality of slots, cavities, channels, and troughs in the second set of passages.

21. An apparatus as defined by claim 15, wherein the first and second set of passages are separated by a material seal coating without the presence of a mechanical seal.

22. An apparatus for separately conveying two gases through a single artifact, comprising:
   a first component having an inlet plate with an inlet surface and an outlet plate with an outlet surface, the inlet and outlet plates being spaced apart from each other to define an interior having a perimeter that is at least partially exposed to an exterior of the first component, and the first component also having a plurality of integral columns extending between the inlet and outlet plates that are accessible from the perimeter;
   a first set of passages formed in each of the plates and extending contiguously through at least some of the columns between the inlet and outlet surfaces for conveying a first gas;
   a second set of passages formed in each of the plates and extending contiguously around at least some of the columns in the interior between the inlet and outlet surfaces, and the second set of passages being completely fluidically isolated from the first set of passages for conveying a second gas;
   a second component secured to the first component to seal the interior of the first component and capture the second set of passages to form a single component that receives two, initially separate gases, and conveys the two gases separately from the inlet surface to the outlet surface, such that the two gases mix and react in a controlled manner upon exiting at the outlet surface; and wherein:
   at the inlet surface, the second set of passages are formed in a circle adjacent the perimeter and circumscribe the first set of passages which are formed in a central, grid-like array, and, at the outlet surface, the first and second set of passages are completely interspersed in a centralized, alternating, grid-like array.

23. An apparatus as defined by claim 22, wherein the first set of passages comprises straight axial apertures that are parallel to each other.

24. An apparatus as defined by claim 22, wherein the inlet and outlet plates are parallel to each other, and the first and second set of passages are coplanar at both the inlet and outlet surfaces.

25. An apparatus as defined by claim 22, wherein, at the inlet surface, the second set of passages are larger in size and fewer in number than the first set of passages, and, at the outlet surface, the first and second set of passages are approximately equal in size and number.

26. An apparatus as defined by claim 22, wherein the columns in the interior of the first component define a plurality of slots, cavities, channels, and troughs in the second set of passages.

27. An apparatus as defined by claim 22, wherein the first and second set of passages are separated by a material seal coating without the presence of a mechanical seal.

* * * * *